(12) United States Patent
Haas et al.

(10) Patent No.: US 10,989,230 B2
(45) Date of Patent: Apr. 27, 2021

(54) METHOD FOR CONTROLLING A MOVEMENT OF A MOVABLY MOUNTED BODY OF A MECHANICAL SYSTEM

(71) Applicant: Primetals Technologies Austria GmbH, Linz (AT)

(72) Inventors: Rainer Haas, Linz (AT); Georg Keintzel, Steyregg (AT); Helmut Kogler, Reichenau (AT)

(73) Assignee: PRIMETALS TECHNOLOGIES AUSTRIA GMBH

( * ) Notice: Subject to any disclaimer, the term of this patent is extended or adjusted under 35 U.S.C. 154(b) by 0 days.

(21) Appl. No.: 16/609,931

(22) PCT Filed: Mar. 20, 2018

(86) PCT No.: PCT/EP2018/056956
§ 371 (c)(1),
(2) Date: Oct. 31, 2019

(87) PCT Pub. No.: WO2018/202354
PCT Pub. Date: Nov. 8, 2018

(65) Prior Publication Data
US 2020/0200195 A1  Jun. 25, 2020

(30) Foreign Application Priority Data
May 2, 2017 (EP) ..................................... 17168918

(51) Int. Cl.
*F15B 9/09* (2006.01)
*F15B 13/02* (2006.01)
(Continued)

(52) U.S. Cl.
CPC ................ *F15B 9/09* (2013.01); *F15B 13/02* (2013.01); *F15B 21/008* (2013.01); *F15B 21/08* (2013.01);
(Continued)

(58) Field of Classification Search
CPC . F15B 9/08; F15B 9/09; F15B 21/008; G05B 11/28
See application file for complete search history.

(56) References Cited

U.S. PATENT DOCUMENTS 4,587,883 A * 5/1986 Ehrentraut ................ F15B 9/09
91/363 R
7,343,845 B2 * 3/2008 Wirtl ................... F15B 13/0433
91/358 R
(Continued)

FOREIGN PATENT DOCUMENTS

DE  10 2013 015 453 A1  7/2014
WO  WO 2016/012471 A1   1/2016

OTHER PUBLICATIONS

International Search Report dated May 28, 2018 in corresponding PCT International Application No. PCT/EP2018/056956.
(Continued)

*Primary Examiner* — Michael Leslie
(74) *Attorney, Agent, or Firm* — Ostrolenk Faber LLP

(57) ABSTRACT

A method for controlling movement of a movably mounted body (14) of a mechanical system (2, 56, 62). The mechanical system (2, 6, 62) includes a drive unit (4, 64), which is operated by a medium, and also a control valve (20, 22). The movably mounted body (14) is driven by the drive unit (4, 64). A drive movement of the drive unit (4, 64) is controlled with the aid of the control valve (20, 22). In order to avoid or reduce excitation of undesired vibrations in the mechanical system (2, 56, 62), it is proposed that the control valve (20, 22) be actuated using a control signal (u(t)) which comprises a first and also a further switching pulse ($S_1$, $S_3$) each having a prespecified pulse duration. The pulse duration of the first switching pulse ($S_1$) is equal to the pulse duration of the further switching pulse ($S_3$). A time difference ($\Delta t_{1-3}$) between the start of the first pulse ($S_1$) and the (Continued)

start of the further switching pulse ($S_3$) is matched to a natural period duration of the mechanical system (2, 56, 62).

16 Claims, 7 Drawing Sheets

(51) Int. Cl.
 *F15B 21/08* (2006.01)
 *G05B 11/28* (2006.01)
 *F15B 21/00* (2006.01)
(52) U.S. Cl.
 CPC ....... *G05B 11/28* (2013.01); *F15B 2211/6336* (2013.01)

(56) References Cited

U.S. PATENT DOCUMENTS

| | | | |
|---|---|---|---|
| 9,500,293 B2* | 11/2016 | Valentin-Rumpel | F15B 5/006 |
| 2013/0248742 A1* | 9/2013 | Schepers | F15B 13/044 |
| | | | 251/129.05 |

OTHER PUBLICATIONS

Written Opinion dated May 28, 2018 in corresponding PCT International Application No. PCT/EP2018/056956.
Extended European Search Report dated Oct. 16, 2017 in corresponding European Patent Application No. 17168918.5.

* cited by examiner

MOTION CONTROL OF A MOVABLY MOUNTED BODY OF A MECHANICAL SYSTEM

METHOD FOR CONTROLLING A MOVEMENT OF A MOVABLY MOUNTED BODY OF A MECHANICAL SYSTEM

CROSS-REFERENCE TO RELATED APPLICATIONS

The present application is a 35 U.S.C. §§ 371 national phase conversion of PCT/EP2018/056956, filed Mar. 20, 2018, the contents of which are incorporated herein by reference which claims priority of European Patent Application No. 17168918.5, filed May 2, 2017, the contents of which are incorporated by reference herein. The PCT International Application was published in the German language.

TECHNICAL FIELD

The invention relates to a method for controlling a movement of a movably mounted body of a mechanical system according to the invention.

TECHNICAL BACKGROUND

Drive units operated with a medium are employed in different technical fields for driving a movably mounted body. Such drive units are used for example in construction machines, machine tools or in rolling mills. Typically, a drive movement of such a drive unit is controlled with the aid of a control valve.

DE 10 2013 015 453 A1 discloses a reciprocating piston pump having an electric drive which comprises a magnetic coil and multiple control valves and discloses a method for operating such a reciprocating piston pump. In a first operating mode, the reciprocating piston pump actively delivers a working fluid to a consumer of the fluid, passively lets the working fluid flow back in a second operating mode and actively suctions the working fluid from the consumer in a third operating mode. Here, switching between the operating modes takes place only by a change of the working frequency and if applicable the signal form of the electrical input signal of the magnetic coil. In the first operating mode, a working frequency is used which lies below the eigenfrequency of the control valves so that the stroke of the control valves exhibits a very small phase shift relative to the movement of the electromagnetic drive. For the second and third operating modes, the pump is operated at frequencies near the eigenfrequency or with frequencies greater than the eigenfrequency of the control valves, so that the control valves exhibit a greater phase shift to the movement of the pump piston. Because of this, a passive return flow or an active return delivery of the working fluid materializes.

In a mechanical system having a movably mounted body and a drive unit operated with a medium for driving the movably mounted body, an excitation of undesirable vibrations of the movably mounted body or of the entire mechanical system can occur during a drive movement of the drive unit.

Such vibrations can be attributed to, among other things, the inertia and/or the damping characteristics of the mechanical system. If the movably mounted body is rotatably/pivotably mounted, this can cause an unfavourable vibration tendency with a low eigenfrequency. Because of technical peripheral conditions, reducing the vibration tendency of a mechanical system by way of its design is often possible only to a limited extent.

A switching frequency of a control valve may control a drive movement of the drive unit; when the switching frequency lies in the vicinity of a eigenfrequency of the mechanical system, particularly high vibration amplitudes can occur during the excitation of such undesirable vibrations.

SUMMARY OF THE INVENTION

It is an object of the invention to avoid or at least reduce an excitation of undesirable vibrations in a mechanical system.

This object is achieved through a method and through use of a mechanical system according to the invention.

For a method according to the invention, the mechanical system comprises a drive unit which is operated by a medium, and a control valve, such that the movably mounted body is driven by the drive unit, and a drive movement of the drive unit is controlled with the aid of the control valve. In the method according to the invention, the control valve is actuated by a control signal which comprises a first and a further switching pulse, each with a predefined pulse duration. The pulse duration of the first switching pulse is equal to the pulse duration of the further switching pulse. A time interval between the start of the first switching pulse and the start of the further switching pulse is adapted to an intrinsic period duration of the mechanical system.

The mechanical system according to the invention comprises a movably mounted body, a drive unit which can be operated by a medium for driving the movably mounted body, and a control valve for controlling a drive movement of the drive unit. In addition, the mechanical system comprises a control unit which may be set up to generate a control signal for actuating the control valve. The control signal comprises a first and a further switching pulse, each pulse having a predefined pulse duration, wherein the pulse duration of the first switching pulse is equal to the pulse duration of the further switching pulse. A time interval between the start of the first switching pulse and the start of the further switching pulse is adapted to an intrinsic period duration of the mechanical system.

The invention is based on the realization that as a function of the inertia of the mechanical system, ringing of the movably mounted body occurs when the control valve is activated by a control signal which has a single switching pulse with which a drive movement of the drive unit is brought about.

When, by contrast, the control valve is activated with a control signal which comprises a first and a further switching pulse of the same pulse duration, and wherein a time interval between the start of the first switching pulse and the start of the further switching pulse is adapted to an intrinsic period duration of the mechanical system, such a ringing of the movably mounted body can be suppressed or at least reduced. In addition, the dynamics of the mechanical system can be increased.

The mechanical system according to the invention is preferably equipped for carrying out the method according to the invention.

The formulation that "the time interval between the start of the first switching pulse and the start of the further switching pulse is adapted to an intrinsic period duration of the mechanical system" can be understood such that this time interval is dependent on that intrinsic period duration or is a function of that intrinsic period duration.

In addition to the movably mounted body, the drive unit and the control valve, the mechanical system can comprise further elements which interact with at least one of these elements and in particular are in contact with and/or connected to at least one of these elements.

The term "intrinsic period" duration means the reciprocal value of an eigenfrequency of the mechanical system. An Eigenfrequency, also known as natural frequency, is one of the frequencies at which a system tends to oscillate in the absence of any driving or damping force. The intrinsic period duration is expediently an intrinsic period duration of a vibratory part of the mechanical system. The vibratory part of the mechanical system preferably comprises at least the drive unit and the movably mounted body. In addition, the vibratory part of the mechanical system can comprise further elements of the mechanical system.

The eigenfrequency has a reciprocal value to which the time interval between the start of the first switching pulse and the start of the further switching pulse is adapted. That eigenfrequency can for example be the lowest eigenfrequency of the mechanical system.

The eigenfrequency can for example be the dominant eigenfrequency of the mechanical system, i.e. that eigenfrequency which has the highest resonance rise. In other words, the time interval between the start of the first switching pulse and the start of the further switching pulse can be adapted to that intrinsic period duration of the mechanical system, the reciprocal value of which corresponds to the dominant eigenfrequency of the mechanical system. The dominant eigenfrequency of the mechanical system can be in particular at the same time the lowest eigenfrequency of the mechanical system.

Supplying the drive unit with the medium can be controlled by the control valve. In other words, the medium pressure present in the drive unit can be controlled with the aid of the control valve.

Advantageously, the control valve is electrically, in particular electromagnetically controllable. It is preferred, furthermore, when a switching position of the control valve is controlled or predefined by the control signal. Expediently, the control signal is an electrical control signal, in particular a digital electrical control signal.

When the control valve is opened, an inflow of the medium in the drive unit or an outflow of the medium from the drive unit is preferably brought about. Expediently, this in turn brings about the drive movement of the drive unit. When the control valve is closed again, this drive movement is preferably stopped.

The drive movement of the drive unit is advantageously translated into the movement of the movably mounted body.

Preferably, the movement of the movably mounted body is activated such that the movably mounted body follows a predefined trajectory.

Furthermore, the drive unit can be connected to the movably mounted body indirectly, for example via a pivot arm, or directly.

The fact that the control unit is equipped for generating the control signal for activating the control valve can, among other things, include that the control unit is programmed in order to generate and, if appropriate, pass, the control signal on to the control valve. Advantageously, the control unit is connected to the control valve in particular via a signal transmission line, for example a field bus.

The determination of the intrinsic period duration or eigenfrequency of the mechanical system can take place by a method known to the person skilled in the art.

For example, the intrinsic period duration can be determined by calculation, in particular from the dimensions and masses of the individual elements of the mechanical system and if appropriate, by further parameters of the mechanical system. Among other things, the determination of the intrinsic period duration by calculation can be effected with the aid of a numerical simulation. Furthermore, the intrinsic period duration or eigenfrequency can be stored in the control unit.

Furthermore, the intrinsic period duration can be determined by one or more measurements. In this case it is advantageous when the mechanical system for the purpose of the measurement of the intrinsic period duration is intentionally excited to vibrate. Preferably, the excitation of the mechanical system causes the mechanical system to vibrate at one or more of its eigenfrequencies. The excitation of the mechanical system can be for example a pulse-like, a sinusoidal or a broad-band excitation.

For example, the mechanical system can be excited to vibrate at one or more of its eigenfrequencies if the control valve is opened for a predefined duration and is subsequently closed again. In particular, the excitation can be caused by opening and closing the control valve as fast as possible.

Furthermore, the vibration movement of the mechanical system can be sensed with the aid of one or more sensors, for example an acceleration sensor, a laser vibrometer, a position sensor and/or a pressure sensor. By measurement values gained in the process, the transfer function of the mechanical system can be determined. Multiple sensors can sense the vibration movement of the mechanical system, particularly in different places.

From the transfer function of the mechanical system, the eigenfrequency or intrinsic period duration, to which the time interval between the first and the further switching pulse is to be adapted, can be determined, for example by a Fourier analysis, in particular utilizing a fast Fourier transform algorithm.

The intrinsic period duration can be a value that is constant over time. Alternatively, it is possible that the intrinsic period duration changes over the time. For example, the intrinsic period duration can be dependent on an operating state and/or an operating duration of the mechanical system. In the case that the intrinsic period duration is variable over time, it is advantageous when the intrinsic period duration is repeatedly determined during the operation, in particular determined cyclically.

Among other things, the movably mounted body can be linearly movably mounted. Furthermore, the movably mounted body can be rotatably/pivotably mounted. The movement of the movably mounted body can be a linear movement, a rotary/pivotal movement, in particular about one of its body axes or about an axis of rotation that does not run through the body, or an overlay of a linear movement and a rotary/pivotal movement.

In addition, the mechanical system can comprise one or more pivot arms to which the movably mounted body is attached.

The mechanical system can in particular be a hydromechanical system. In a preferred manner, the medium, by way of which the drive unit is operated, is a liquid, in particular oil.

The drive unit can be realized in particular, by a linear drive unit, for example as a hydraulic cylinder. Accordingly, the drive movement of the drive unit can be a linear or translational drive movement.

Alternatively, the drive unit can be designed as a rotary drive unit, in particular as a hydraulic motor. In this case, the drive movement of the drive unit is expediently a rotary drive movement.

It is preferred, furthermore, that the drive unit comprise a moveable drive element, for example a rotor or a movably mounted piston. Expediently, the moveable drive element of the drive unit performs the said drive movement of the drive unit.

The control valve, by which the drive movement of the drive unit is controlled, can, for example, be a proportional valve, in particular a servo valve, or a switching valve, i.e. a discretely switching (open/close) valve.

According to an advantageous further development of the invention, the control valve is a digital valve, also referred to as digital hydraulic valve. Since digital valves have short switching times (usually in the millisecond range), fast switching operations can be realized if the control valve is so configured. t If the control valve is so configured, the medium flow can be additionally predefined precisely by the control valve. A further advantage of a digital valve is that it is typically more insensitive to oil contamination than conventional proportional valves.

Preferably, the time interval between the start of the first switching pulse and the start of the further switching pulse is a linear function of the intrinsic period duration. The time interval between the start of the first switching pulse and the start of the further switching pulse can be proportional to the intrinsic period duration.

According to a preferred embodiment of the invention, the time interval between the start of the first switching pulse and the start of the further switching pulse is at least half of the intrinsic period duration.

In particular, if the control valve has a switching time which is longer than a sixth of the intrinsic period duration, the time interval between the start of the first switching pulse and the start of the further switching pulse can be a function of this switching time, preferably a linear function of the switching time. The switching time can be the opening time or the closing time of the control valve. Preferably, the opening and the closing times of the control valve are the same.

It is particularly preferred when the opening and closing time of the control valve is shorter than a sixth of the intrinsic period duration. In this case, the pulse durations of the switching pulses and/or the time interval between them can be independent of the opening and closing time of the control valve.

Furthermore, the pulse duration of the first switching pulse and the pulse duration of the further switching pulse are preferably adapted to the intrinsic period duration. For example, the pulse duration of the first switching pulse and the pulse duration of the further switching pulse can in each case be a linear function of the intrinsic period duration. In particular, the pulse duration of the first switching pulse and the pulse duration of the further switching pulse can in each case be proportional to the intrinsic period duration.

Furthermore, in particular, if the control valve has a switching time which is longer than a sixth of the intrinsic period duration, the pulse duration of the first switching pulse and the pulse duration of the further switching pulse can in each case be a linear function of the switching time.

If the control valve has a switching time that is longer than a sixth of the intrinsic period duration, the pulse duration of the first and of the further switching pulses can be for example equal to the arithmetic mean of the switching time and a sixth of the intrinsic period duration. Otherwise, the pulse duration of the first switching pulse and the pulse duration of the further switching pulse can for example be equal to a sixth of the intrinsic period duration.

Preferably, the two switching pulses cause the moveable drive element of the drive unit to be moved by a predefined step width. The predefined step width can for example be a (rotary) angle or a (movement) distance.

Furthermore, the predefined step width is advantageously a linear function of the intrinsic period duration. When a switching time of the control valve is greater than a sixth of the intrinsic period duration, the predefined step width is preferably proportional to the arithmetic mean of the switching time of the control valve and a sixth of the intrinsic period duration. Otherwise, the predefined step width is preferably proportional to the intrinsic period duration.

In addition, the control signal can have an additional switching pulse with a predefined pulse duration between the first and the further switching pulse. The control signal can have the additional switching pulse, particularly when a set point value of a movement parameter of the drive unit is greater than the predefined step width which is brought about by the first and the further switching pulses.

The pulse duration of this additional switching pulse is preferably dependent on the set point value of the movement parameter. It is particularly preferred that the pulse duration of the additional switching pulse be a linear function of the set point value of the movement parameter. The time interval between the start of the first switching pulse and the start of the further switching pulse preferably depends on the pulse duration of the additional switching pulse that may be present.

When the predefined step width is equal to the set point value of the movement parameter, the control signal preferably has no such additional switching pulse.

Each of the switching pulses preferably causes the control valve to open. This means that the control valve is preferably opened during each of the switching pulses. Between the first and the additional switching pulses, between the additional and the further switching pulses and after the further switching pulse, the control valve is closed in a preferred manner.

In case the control signal only has the first and the further switching pulses, the moveable drive element of the drive unit is preferably moved by the predefined step width. By contrast, when the control signal has all three previously mentioned switching pulses, the moveable drive element is preferably moved by the set point value of the movement parameter. With the aid of the additional switching pulse, a movement distance or rotation angle of the moveable drive element of the drive unit can be realized, which is greater than the predefined step width.

If the drive unit is a linear drive unit, the movement parameter can, for example, be a linear travel. The set point value of the movement parameter can thus be for example a travel to be covered by the drive unit, more precisely by its moveable drive element. In other words, the pulse duration of the additional switching pulse can depend on the travel which the drive unit or its moveable drive element is to cover during the drive movement.

In the case that the drive unit is a rotary drive unit, the movement parameter can for example be a rotation angle. The set point value of the movement parameter can thus, for example, be a rotation angle to be covered by the drive unit, more precisely by its moveable drive element. This means that the pulse duration of the additional switching pulse can depend on the rotation angle by which the drive unit or its moveable drive element is to be rotated during the drive movement.

A time interval between the start of the first switching pulse and the start of the additional switching pulse is preferably a linear function of the intrinsic period duration.

If the control valve has a switching time that is longer than a sixth of the intrinsic period duration, the time interval between the start of the first switching pulse and the start of the additional switching pulse can, for example, be the arithmetic mean of double the switching time and a third of the intrinsic period duration. Otherwise, the time interval between the start of the first switching pulse and the start of the additional switching pulse can, for example, be equal to a third of the intrinsic period duration.

In a preferred manner, the first and the additional switching pulses are separated from one another by a first pause with a predefined pause duration. In addition, the additional and the further switching pulses are preferably separated from one another by a second pause with a predefined pause duration. The pause duration of the first pause and the pause duration of the second pause can each be a linear function of the intrinsic period duration. During the respective pause, the control valve is expediently closed.

The pause duration of the first pause can be equal to the pause duration of the second pause. Furthermore, the pause duration of the first pause and the pause duration of the second pause can, for example, be equal to the pulse duration of the first switching pulse.

If the control valve has a switching time that is longer than a sixth of the intrinsic period duration, the respective pause duration can, for example, be equal to the arithmetic mean of the switching time and a sixth of the intrinsic period duration. Otherwise, the respective pause duration can, for example, be equal to a sixth of the intrinsic period duration.

The switching pulses of the control signal can be square pulses, i.e. switching pulses with an at least substantially rectangular form. Basically, one or more of the switching pulses of the control signal can have a different pulse form.

Furthermore, the control valve can be "ballistically" activated by the control signal. Here, a ballistic activation of the control valve can mean an activation during which one or more of the switching pulses of the control signal are so short that through the pulse-like actuation of the control valve its shut-off body is thrust in the opening direction without the shut-off body reaching its end position with full opening of the control valve, and the shut-off body subsequently, under the effect of a valve spring of the control valve and/or under the effect of flow forces, falls back again in the direction of its closed end position. During the ballistic activation of the control valve, the first and/or the further switching pulses can have a pulse duration that is shorter than the switching time of the control valve.

Preferably, the control valve is "ballistically" activated when the control valve has a switching time that is longer than a sixth of the intrinsic period duration. However, a ballistic activation of the control valve can also take place when the switching time of the control valve is shorter than a sixth of the intrinsic period duration, in order to realize particularly small step widths of the drive element.

The time interval between the first and the further switching pulses is conditioned on the intrinsic period duration. If undesirable vibrations in the mechanical system are to be avoided or at least reduced, the time interval between the first and the further switching pulses is to be adapted to the intrinsic period duration as previously mentioned. Otherwise, i.e. upon an arbitrary selection of the time interval between the first and the further switching pulse, ringing of the movably mounted body with a large vibration amplitude can occur.

In practice, the real behavior of a control valve can deviate from the "ideal behavior" (switching on and off without delay). In particular, dead times and/or different switching times can occur during the opening and closing of the control valve. Such deviations from the ideal behavior can be compensated for by adaptation of the switching times. Such an adaptation can be effected manually or with the aid of partly- or fully-automated algorithms, for example, an "iterative learning control".

Among other things, the method according to the invention can be employed in a rolling mill. Here, the mechanical system can be a rolling mill apparatus or a structural unit of a rolling mill apparatus.

In an advantageous further development of the invention, the movably mounted body is a pressure roller of a coiler. Thus, the method according to the invention can be employed in for controlling the movement of a pressure roller. In this case, the drive unit is preferably a hydraulic cylinder. It is preferred, furthermore, when the mechanical system comprises at least one pivot arm to which the pressure roller is attached. The coiler is preferably utilized for winding up a metal strip into a coil.

Preferably, the pressure roller is pressed against the metal strip with the aid of the drive unit during a winding operation of the metal strip, during which the metal strip is wound up on a coiler drum. In this way, the metal strip can be securely guided about the coiler drum.

Furthermore, when the pressure roller is moved by the drive movement of the drive unit at least during a phase of the winding operation, in particular during an initial phase of the winding operation in such a manner that in each case when a strip beginning of the metal strip lying on the coiler drum passes through between the pressure roller and the coiler drum, it is advantageous that the pressure roller is spaced apart from the metal strip. In this way, a pressing-in of the inner windings of the metal strip against the strip beginning by the pressure roller can be avoided.

The beginning of the strip can be considered that transverse edge of the metal strip which forms the inner end of the coil. A transverse edge of the metal strip in turn can be considered to be an edge that is oriented perpendicularly to the longitudinal direction of the metal strip or perpendicularly to its longitudinal edges.

A predefined time duration each before a time at which the strip beginning of the metal strip is situated between the pressure roller and the coiler drum, more precisely between their axes of rotation, the pressure roller is advantageously removed from the metal strip with the aid of the drive unit. This is also referred to as "lifting-off the pressure roller".

The predefined time duration advantageously depends on a rotational speed of the coiler drum.

In each case a predefined time duration after the time at which the strip is situated at the beginning of the metal strip between the pressure roller and the coiler drum, more precisely between their axes of rotation, the pressure roller is advantageously again pressed against the metal strip with the aid of the drive unit. This is also referred to as "setting the pressure roller". This predefined time duration advantageously also depends on the rotational speed of the coiler drum.

The previously described type of movement of the pressure roller is also referred to among experts as step control, which is attributable to the fact that the pressure roller in the process moves step-like, figuratively speaking.

In particular, at high winding speeds, a rapid lifting-off or setting of the pressure roller may be required in the step control. In addition, this is advantageous during the step control that vibrations of the pressure roller are preferably avoided in order to securely avoid the inner windings of the coil being pressed in against the strip beginning. The rapid lifting-off and setting of the pressure roller and the reduction of vibrations of the pressure roller can be achieved by activating the control valve with the control signal.

The coiler preferably comprises multiple such pressure rollers, in particular three or four of them. In a preferred manner, all pressure rollers of the coiler are controlled in the described manner. In particular, the control of the pressure rollers can take place under the constraint that following the winding-up of the first winding of the metal strip, a maximum of one of the pressure rollers is lifted off the metal strip during the phase of the winding operation.

In another advantageous configuration of the invention, the movably mounted body is a loop lifter roller. Alternatively, the movably mounted body can, for example, be a roll. The method according to the invention can thus be employed for controlling the movement of a roll or of a loop lifter roller.

Further it can be provided that with the aid of a sensor, which can be in particular an element of the mechanical system, a status parameter of the drive unit is measured. The status parameter can, for example, be a position of the moveable drive element of the drive unit, a pressure acting on the drive element or a force acting on the drive element. Accordingly, the sensor can, for example, be a position sensor, a pressure sensor or a force sensor.

This sensor is preferentially connected to the previously mentioned control unit via a signal transmission line. Furthermore, the control unit can be programmed to adjust the pulse duration of the additional switching pulse as a function of a measured value of the status parameter of the drive unit. This means that the pulse duration of the additional switching pulse can be a function of the status parameter of the drive unit.

Furthermore, "simple movements" of the movably mounted body, i.e. such movements during which vibrations of the movably mounted body are uncritical, can be realized with the aid of the said control valve or with the aid of another control valve. Such a "simple movement" can, in the case of a pressure roller, for example, be a pivoting in or out of the pressure roller.

The other control valve that can be employed for realizing such "simple movements" can, for example, be a proportional valve, in particular a conventional proportional valve or servo valve. Furthermore, the other control valve can be a digital valve. The first-mentioned control valve or the other control valve can for example be activated with a PWM activation (PWM=pulse width modulation) for realizing "simple movements".

Advantageously, the mechanical system comprises a pressure source, which expediently serves for providing the medium used for operating the drive unit with a predefined pressure level.

Furthermore, the mechanical system advantageously comprises a first line by which the control valve is connected to the pressure source. Furthermore, it is advantageous when the mechanical system comprises a second line by which the control valve is connected to the drive unit.

The pressure source can, for example, be a tank in which the medium is stored. Alternatively, the pressure source can, for example, be a pump. In the last-mentioned case, the drive unit is expediently connected to the delivery side of the pump via the lines.

In addition, it is advantageous when the mechanical system comprises a pressure accumulator, which is connected to one of the two lines. During a switching operation of the control valve, the aid of the pressure accumulation can avoid pressure peaks and/or cavitation in the mechanical system, particularly in the lines of the same. In particular, during a sudden pressure rise in one of the lines, the pressure accumulator can absorb a certain quantity of the medium from the lines or, during a sudden pressure drop in one of the lines, it can introduce a certain quantity of the medium into the lines.

The pressure accumulator is partly filled with a gas. Since gases are generally more easily compressible than liquids, the pressure accumulator can react particularly quickly to pressure fluctuations in this way.

Furthermore, it is advantageous when the mechanical system comprises a pressure sink. The pressure sink expediently serves for receiving the medium from the drive unit. Advantageously, the drive unit is connected to the pressure sink via one or more further lines, wherein the further line/s can be preloaded.

The pressure sink can for example, be a tank having an inlet at which there is preferably a lower pressure than at an outlet of the pressure source. Alternatively, the pressure sink can be a pump. The drive unit is expediently then connected to the suction side of this pump via the further line or the further lines.

Furthermore, the mechanical system can comprise a further control valve in addition to the first-mentioned control valve for controlling the drive movement of the drive unit, which valve is connected in parallel with the first-mentioned control valve. In this way, a higher medium flow from the pressure source to the drive unit and/or from the drive unit to the pressure sink can be realized. These two control valves can be embodied as identical in construction. Alternatively, the first-mentioned control valve and the further control valve for controlling the drive movement of the drive unit can be different valves. Then these two valves can be used for realizing different travels or rotation angles of the drive element.

Furthermore, these two control valves can be alternately switched. In this way, the effective switching frequency of the parallel connection of the control valves, can be increased, compared with the effective switching frequency of the parallel connection with simultaneous switching of the control valves.

Generally, the mechanical system can comprise multiple ones of such parallel connections of control valves for controlling the drive movement of the drive unit.

The description of advantageous configurations of the invention given so far includes numerous features which in this disclosure are partly rendered combined into a plurality. However, these features can expediently be also considered individually and combined into further practical further combinations. In particular, these features are each combinable individually and in any suitable combination with the method according to the invention and the mechanical system according to the invention. Furthermore, method features can also be seen as a characteristic of the relevant apparatus unit.

In this description some terms are each used in the singular or in conjunction with a numeral. The extent of the invention for these terms should not be restricted to the singular or the respective numeral.

The characteristics, features and advantages of the invention described above, and the manner in which these are achieved, become clearer and more clearly understandable in connection with the following description of the exemplary embodiments of the invention, which are explained in more detail in connection with the drawings. The exemplary embodiments serve for explaining the invention and do not limit the invention to the combinations of features stated therein nor with regard to functional features. In addition to this, suitable features of each exemplary embodiment can also be explicitly viewed in isolation, removed from an exemplary embodiment, introduced into another exemplary embodiment for the completion of the same and combined with any of the claims.

BRIEF DESCRIPTION OF THE DRAWINGS

FIG. 3 show three diagrams in which different control valve control signals are shown as a function of the time and associated time profiles of a position and speed of the drive piston, wherein

FIG. 4 show the same measurement diagrams as in FIG. 3, wherein

FIG. 5 show the same measurement diagrams as in FIG. 3, wherein

FIG. 6 show three diagrams, in which a valve piston position is shown as a function of the time and associated time profiles of a position and speed of the drive piston with a ballistic valve activation are shown;

DESCRIPTION OF EMBODIMENTS

Figure 1:
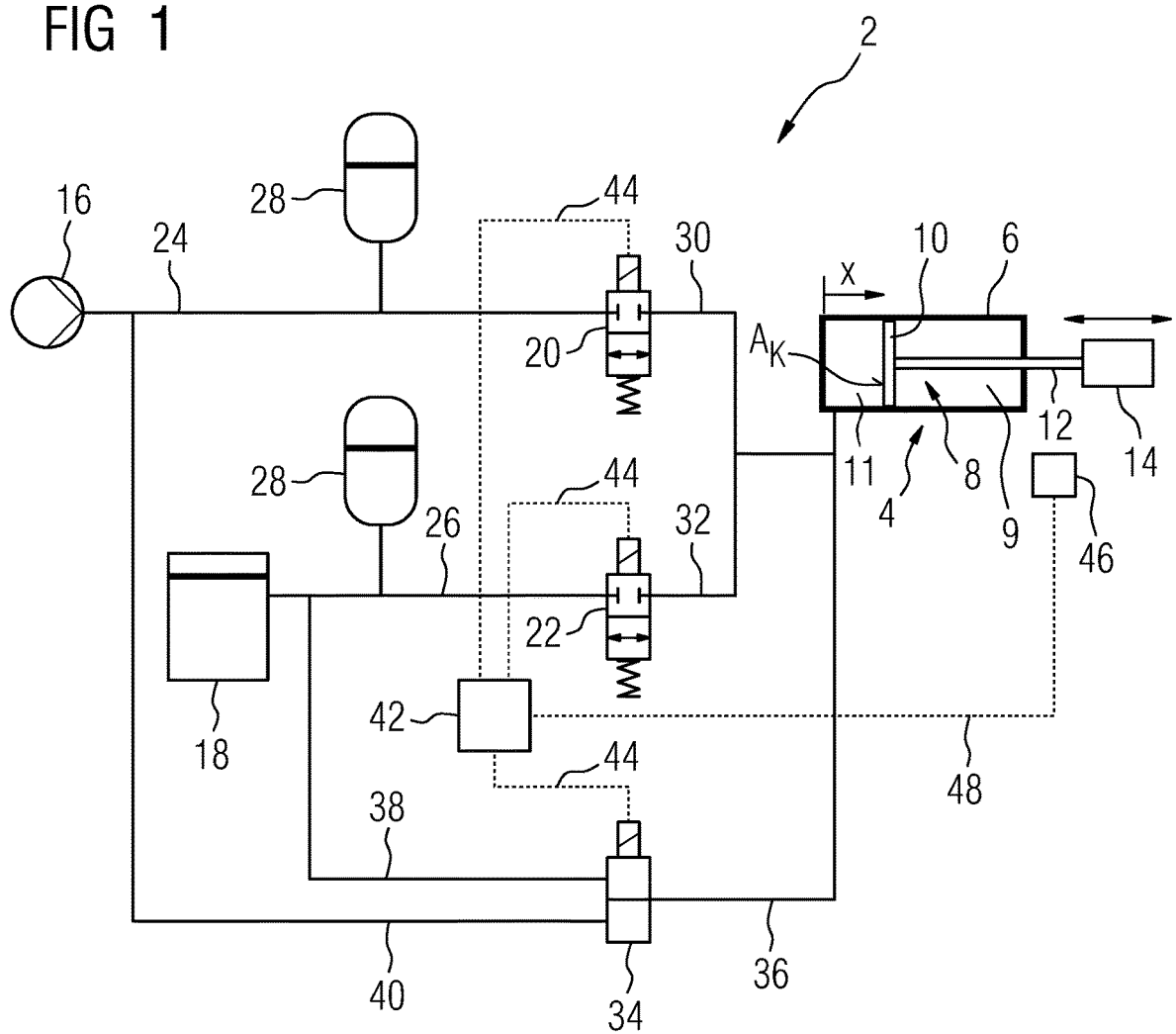
FIG. 1 shows a mechanical system comprising a hydraulic cylinder with a drive piston, a movably mounted body, multiple control valves and a control unit.

FIG. 1 shows a schematic representation of a mechanical system 2.

The mechanical system 2 comprises, among other things, a drive unit 4 that can be operated with a medium, in particular with oil. In the present exemplary embodiment, the drive unit 4 is designed as hydraulic cylinder.

The drive unit 4 comprises a housing 6. In addition, the drive unit 4 comprises a linearly moveable drive piston 8 as its moveable drive element, wherein the drive piston 8 comprises a piston head 10 and a piston rod 12 that is connected to the piston head 10.

Furthermore, the mechanical system 2 comprises a movably mounted body 14 which is driven by the drive unit 4. The movably mounted body 14 is connected to the drive piston 8, more precisely to the piston rod 12. In the present example, the movably mounted body 14 is mounted so as to be linearly moveable.

Furthermore, the mechanical system 2 comprises a pressure source 16 and a pressure sink 18. The pressure source 16 in the present example is a pump which at its outlet provides the previously mentioned medium with a pressure of typically approximately 300 bar.

In addition, the mechanical system 2 comprises a first control valve 20 which is designed as digital valve, and a second control valve 22, which is likewise designed as digital valve. In the present exemplary embodiment, the first and second control valve 20, 22 are embodied identically in construction and are therefore identical in their switching time $t_s$. Here, the opening time of the respective control valve 20, 22 is referred to as closing time $t_s$ which at the same time corresponds to its closing time. Thus it is assumed that with respect to the control valves 20, 22 the opening time coincides with the closing time.

In addition, the mechanical system 2 comprises a first fluid line 24, via which the first control valve 20 is connected to the pressure source 16, and a second fluid line 26, via which the second control valve 22 is connected to the pressure sink 18.

In the present example, the previously mentioned pressure sink 18 is a tank which is preloaded in such a manner that in the second fluid line 26 at the second control valve 22, there is a pressure of typically approximately 20 bar.

Apart from the foregoing, the mechanical system 2 comprises two pressure accumulators 28 which are partly filled with a gas. One accumulation is connected to the first fluid line 24 and the other one is connected to the second fluid line 26. By means of these two pressure accumulators 28, pressure peaks and/or cavitation during switching operations of the control valves 20, 22 can be avoided.

Furthermore, the first control valve 20 is connected to the so-called piston side of the drive unit 4 via a third fluid line 30 of the mechanical system 2. The second control valve 22 is likewise connected to the piston side of the drive unit 4 via a fourth fluid line 32 of the mechanical system 2.

The mechanical system 2 comprises a further control valve 34 which is designed as a proportional valve, in particular as a multi-way valve. The further control valve 34 is likewise connected to the piston side of the drive unit 4 via a fifth fluid line 36 of the mechanical system 2. Furthermore, the further control valve 34 is connected to the pressure sink 18 via a sixth fluid line 38 of the mechanical system 2. A seventh fluid line 40 of the mechanical system 2 connects the further control valve 34 to the pressure source 16.

Each of the three control valves 20, 22, 34 comprises an electromagnetically controlled valve piston as a shut-off body and a valve spring.

The further control valve 34 has a switching position in which the medium can flow from the drive unit 4 to the pressure sink 18. The further control valve 34 has a switching position in which the medium can flow from the pressure source 16 to the drive unit 4. In addition, the further control valve 34 has a switching position in which a medium flow through the further control valve 34 is prevented.

The mechanical system 2 is equipped with a control unit 42 for controlling the control valves 20, 22, 34 and the unit is connected to each of the three control valves 20, 22, 34 in each case via a signal transmission line 44. The valve position of the respective control valve 20, 22, 34 is controlled by the control unit 42. For this purpose, the control unit 42 generates electrical control signals for the control valves 20, 22, 34 and passes the control signals on to the control valves 20, 22, 34 via the signal transmission lines 44.

When the first control valve 20 is opened and the second control valve 22 is closed and the further control valve 34 is in the switching position in which a medium flow through the further control valve 34 is prevented, the medium provided by the pressure source 16 flows into the drive unit 4 via the first control valve 20. This moves the drive piston 8 out of the housing 6 of the drive unit 4.

By contrast, when the first control valve 20 is closed, the second control valve 22 is opened and the further control valve 34 is in the switching position in which a medium flow through the further control valve 34 is prevented, the medium flows out of the drive unit 4 into the pressure sink 18 via the second control valve 22. This retracts the drive piston 8 into the housing 6 of the drive unit 4.

The movement of the drive piston 8 represents a drive movement of the drive unit 4 through which the movably mounted body 14 is driven.

On its so-called ring side 9, i.e. on that side on which the piston rod 12 of the drive piston 8 is located, the drive unit 4 is connected to a pressure regulating device which is not shown. The pressure regulating device ensures that a medium, which is present within the drive unit 4 on the ring side, can flow out of the drive unit 4 on the ring side 9 when, on the piston side 11 of the drive unit 4, a pressure increase takes place. In addition, the pressure regulating device ensures that in the case of a pressure decrease on the piston side 11, the medium on the ring side 9 can (again) flow into the drive unit 4. Alternatively or additionally, the drive unit 4 can comprise a return spring, which is not shown, in order to make possible a return movement of the drive piston 8 directed from the ring side 9 towards the piston side 11.

The further control valve 34 is preferably utilized for realizing simple movements of the movably mounted body 14, during which vibrations of the movably mounted body 14 are uncritical. In a preferred manner, the further control valve 34 is activated by the control unit 42 by means of a PWM activation. It is possible, furthermore, that the first control valve 20 and/or the second control valve 22 are/is activated by the control unit 42 by means of a PWM activation in order to realize such a simple movement of the movably mounted body 14, during which vibrations of the movably mounted body 14 are uncritical.

In addition, the mechanical system 2 comprises a position sensor 46 which is connected to the control unit 42 via a further signal transmission line 48. The position sensor 46 measures a position x of the drive piston 8 and passes the measured position x on to the control unit 42.

The activation of the control valves 20, 22, 34 by the control unit 42 can take place as a function of the measured position x of the drive piston 8. Such a position regulation can be realized for example with the aid of the position sensor 46 in order to reduce residual errors during the positioning of the drive piston 8 carried out with the aid of the control valves 20, 22, 34.

Figure 2:
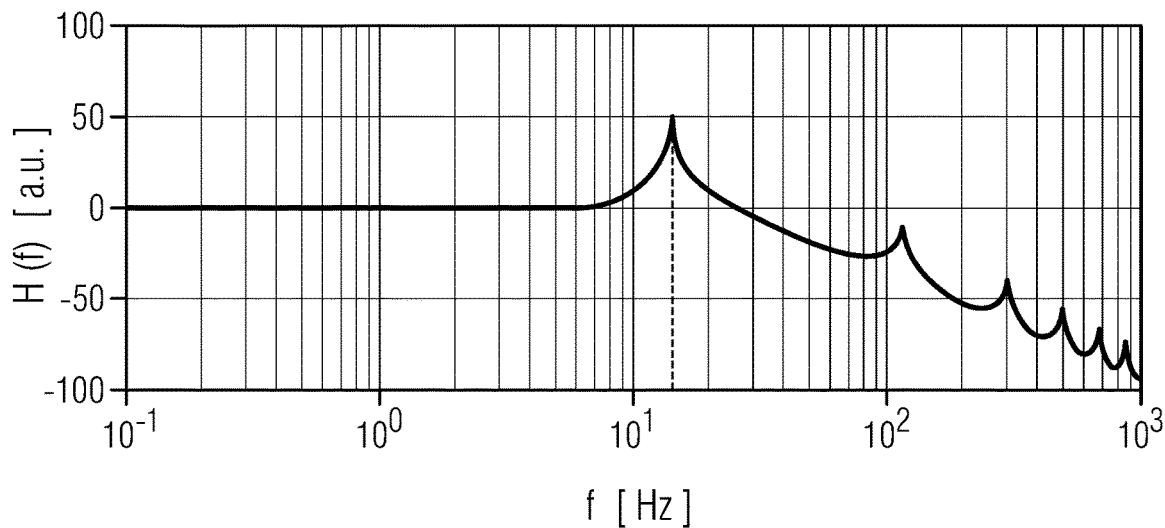
FIG. 2 shows an exemplary transfer function of the mechanical system from FIG. 1.

FIG. 2 shows a diagram in which an exemplary transfer function H(f) of the mechanical system 2 from FIG. 1 is shown as a function of a frequency f.

On the abscissa of this diagram, the frequency f is plotted in logarithmic representation in the unit Hz, while on the ordinate of the diagram the transfer function H(f) is plotted in arbitrary units ("arbitrary units"=a.u.).

As is evident in the transfer function H(f), the mechanical system 2 from FIG. 1 has multiple eigenfrequencies which are noticeable as peaks in the diagram. In the present exemplary embodiment, the dominant eigenfrequency of the mechanical system 2, which at the same time is the smallest eigenfrequency of the mechanical system, is around 14.4 Hz.

The following applies to the associated intrinsic period duration $T_1$ i.e. for the reciprocal of this eigenfrequency:

$$T_1 = \frac{1}{14.4 \text{ Hz}} \approx 69.4 \text{ ms}$$

The following presumes that the switching time $t_s$ of the first control valve 20 is shorter or equal to a sixth of the intrinsic period duration $T_1$. Preferably, the switching time $t_s$ of the first control valve 20 is shorter than a sixth of the intrinsic period duration $T_1$. It is particularly preferred when the switching time $t_s$ of the first control valve 20 is less than 5 ms.

In order to realize, for example, a drive movement of the moveable drive element of the drive unit 4 with the aid of the first control valve 20, during which an excitation of undesirable vibrations of the mechanical system 2 is largely avoided, the control unit 42 activates the first control valve 20 with a digital electrical control signal u(t), the time profile of which can be mathematically expressed by the following formula (control signal u(t) in arbitrary units):

$$u(t) = \begin{cases} 1 & \text{for } 0 \le t \le \tau_1 = \frac{T_1}{6} \\ 0 & \text{for } \tau_1 < t < \tau_2 = 2\tau_1 \\ p & \text{for } \tau_2 \le t \le \tau_3 = \tau_2 + \frac{\Delta x - \Delta x_{min}}{v} \forall \Delta x \ge \Delta x_{min} \\ 0 & \text{for } \tau_3 < t < \tau_4 = \tau_3 + \tau_1 \\ 1 & \text{for } \tau_4 \le t \le \tau_5 = \tau_4 + \tau_1 \\ 0 & \text{for } t > \tau_5 \end{cases}$$

With the following definition:

$$p = \begin{cases} 1 & \text{for } \Delta x > \Delta x_{min} \\ 0 & \text{for } \Delta x = \Delta x_{min} \end{cases}$$

The quantity t stands for the time.

From the formula for u(t), it follows that the control signal u(t) in the time $0 \le t \le \tau_1$ has a first switching pulse $S_1$ and in the time $\tau_4 \le t \le \tau_5$ has a further switching pulse $S_3$.

From the definition of the parameter p it follows, that the control signal u(t) between the first and the further switching pulse $S_1$, $S_3$ during the time interval $\tau_2 \leq t \leq \tau_3$ has an additional switching pulse $S_2$ in the case that $\Delta x$ is greater than $\Delta x_{min}$. If however $\Delta x$ is equal to $\Delta x_{min}$, the control signal u(t) between the first and the further switching pulse $S_1$, $S_3$ has no such additional switching pulse $S_2$. Each of the switching pulses $S_1$, $S_2$, $S_3$ causes the first control valve 20 to be opened.

The quantity $\Delta x$ stands for the desired travel of the movable drive element of the drive unit 4, i.e. for the set point value of the travel of the drive piston 8. Furthermore, $\Delta x_{min}$ stands for a predefined step width by which the drive piston 8 is moved when the control signal u(t) only has the first and further switching pulse $S_1$, $S_3$ and not the additional switching pulse $S_2$.

Furthermore, $\bar{v}$ stands for the mean movement speed of the drive piston 8 with the first control valve 20 in the opened state. The mean movement speed $\bar{v}$ is equal to the quotient of the mean volumetric flow Q of the medium which in the opened state flows through the first control valve 20, and the piston area $A_K$ of the piston head 10 (see FIG. 1). Thus the following applies:

$$\bar{v} = \frac{Q}{A_K}$$

$\Delta x_{min}$ corresponds to the smallest possible step width that can be realized with the drive unit 4 when the first control valve 20 is activated with the said control signal u(t), wherein $\Delta x_{min}$ is given by:

$$\Delta x_{min} = 2\bar{v}\tau_1 = \frac{2Q\tau_1}{A_K}$$

Figure 3C:
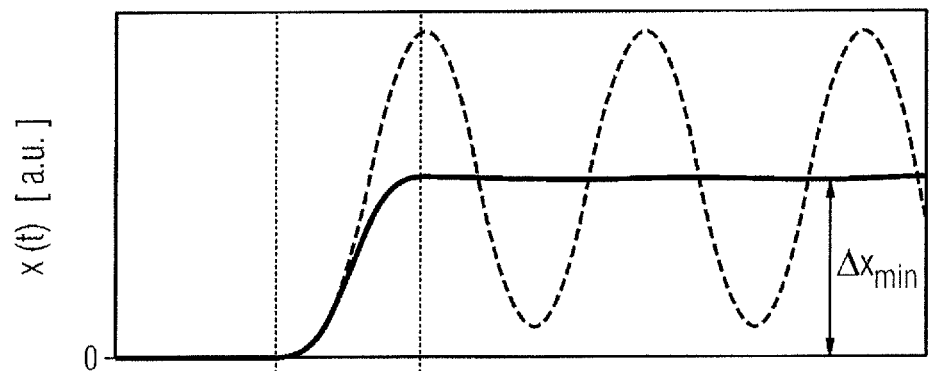
FIG. 3C shows the position x(t) of the drive piston according to a first embodiment of the invention and a further position as a function of time.
Figure 3B:
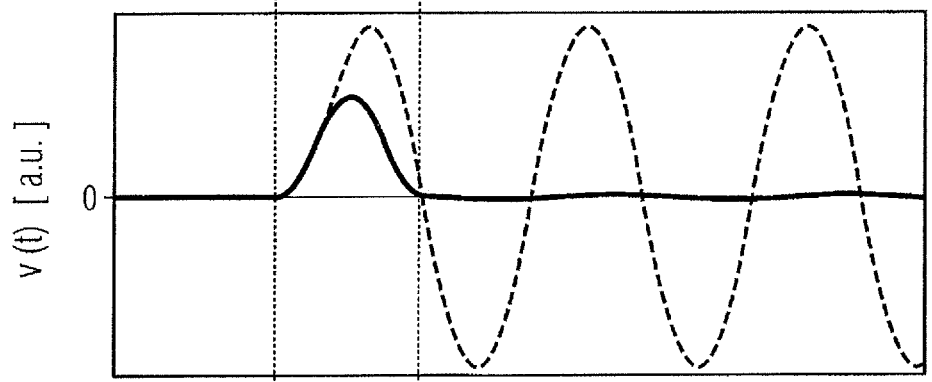
FIG. 3B shows the speed v(t) according to a first embodiment of the invention and a further speed as a function of time.
Figure 3A:
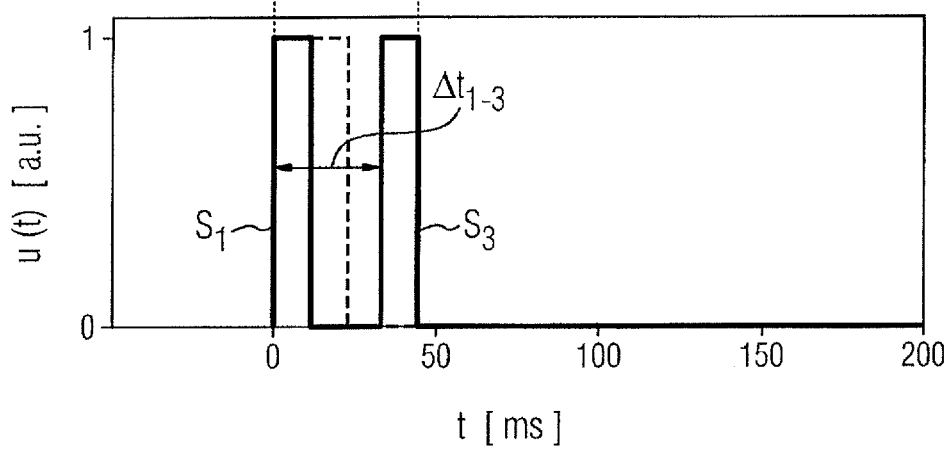
FIG. 3A shows the control signal u(t) according to a first embodiment of the invention and a further control signal as a function of time.

In FIGS. 3A, 3B and 3C, three diagrams are shown. The abscissas of these three diagrams each represent the time t, wherein the abscissas of all three diagrams cover the same period of time. The ordinates of the diagrams each represent another quantity in arbitrary units.

The diagram of FIG. 3A shows the control signal u(t) as a function of the time t in the form of a continuous line, wherein the control signal u(t) is shown here for the case that the desired travel $\Delta x$ is equal to $\Delta x_{min}$.

In the present case, the control signal u(t) has the previously mentioned first switching pulse $S_1$ and the previously mentioned further switching pulse $S_3$. However, the control signal u(t) in this case (i.e. with $\Delta x = \Delta x_{min}$) does not have any additional switching pulse $S_2$ between these two switching pulses $S_1$, $S_3$.

The first switching pulse $S_1$ causes an acceleration of the drive piston 8 (and thus also of the movably mounted body 14 attached to the drive piston 8), wherein because of its inertia, the mechanical system 2 reacts with a delay to the first switching pulse $S_1$. The further switching pulse $S_3$ prevents that the drive piston 8 rings after the end of the first switching pulse $S_1$.

The first and the further switching pulses $S_1$, $S_3$ have the same pulse duration $\tau_1$, wherein the pulse duration $\tau_1$ of these two switching pulses $S_1$, $S_3$ is adapted to the intrinsic period duration $T_1$ of the mechanical system 2. More precisely, the pulse duration $\tau_1$ of the two switching pulses $S_1$, $S_3$ corresponds to a sixth of the intrinsic period duration $T_1$—in the present example, thus approximately 11.6 ms.

Between the two switching pulses $S_1$, $S_3$, the control signal u(t) has a pause with a predefined pause duration, wherein the pause duration is twice as long as the pulse duration $\tau_1$ of the two switching pulses $S_1$, $S_3$. In the present case, the time interval $\Delta t_{1-3}$ between the start of the first switching pulse $S_1$ and the start of the further switching pulse $S_3$ switching pulse thus corresponds to $3\tau_1 = T_1/2$.

In the diagram of FIG. 3C, the position x(t) of the drive piston 8 is shown as a function of the time t in the form of a continuous line. In this diagram, upon an activation of the first control valve 20 with the control signal u(t) shown in FIG. 3A (see continuous line in the diagram of FIG. 3A) the drive piston 8 moves by the distance $\Delta x_{min}$, without any noteworthy vibration. Accordingly, the movably mounted body 14 attached to the drive piston 8 also moves by the distance $\Delta x_{min}$ without significant vibration.

In the middle diagram of FIG. 3B, the speed v(t) of the drive piston 8 is shown in the form of a continuous line, and has a pulse-like profile.

When the first control valve 20 is repeatedly activated with the control signal u(t), which is shown in the lower diagram of FIG. 3C (see continuous line in the lower diagram of FIG. 3C), the drive piston 8 in the process moves each time by the distance $\Delta x_{min}$. In this way, a step drive (with the step width $\Delta x_{min}$) can be realized.

From the three diagrams of FIGS. 3A, 3B and 3C, because of the inertia of the mechanical system 2, it is evident that the drive piston 8 reacts with a delay to an acceleration by the first switching pulse $S_1$. From the three diagrams it is evident, furthermore, that the movement of the drive piston 8 ends at the same time as the end of the further switching pulse $S_3$.

Furthermore, another control signal (not according to the invention) for the first control valve 20 is shown in the form of a dashed line for comparison in the lower diagram of FIG. 3C, which control signal only has a single switching pulse which starts at t=0 and the pulse duration of which is twice as long as the pulse duration $\tau_1$ of the first switching pulse $S_1$. When the first control valve 20 is activated with this other control signal, the drive piston 8 likewise moves by the distance $\Delta x_{min}$. However, the drive piston 8 in this case oscillates around the position $x=\Delta x_{min}$ (see dashed lines in the diagrams of FIGS. 3C, and 3B). Accordingly, with such an activation, the movably mounted body 14 of the mechanical system 2 attached to the drive piston 8 also oscillates.

In FIG. 4, three diagrams 4A, 4B and 4C are likewise shown. These three diagrams show the same three quantities as a function of the time t which are also shown in FIGS. 3A, 3B and 3C as a function of the time t, namely the control signal u(t), the position x(t) of the drive piston and the speed v(t) of the drive piston 8.

Figure 4C:
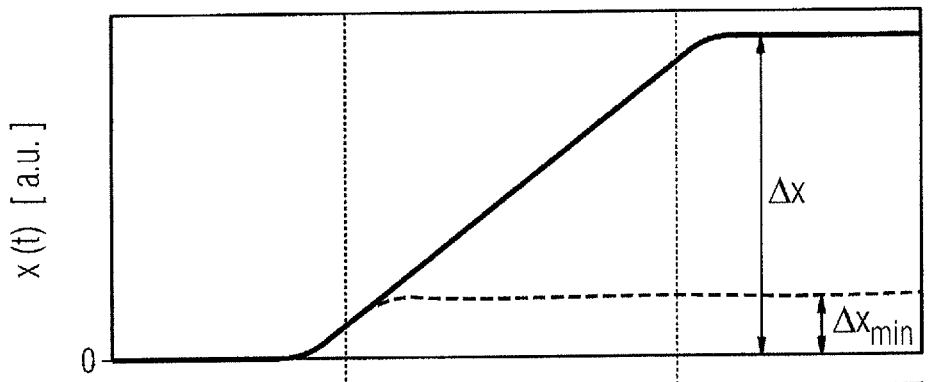
FIG. 4C shows the same position measurement of the entire piston as a function of time as in FIG. 3C according to a first and a second embodiment of the invention.
Figure 4B:
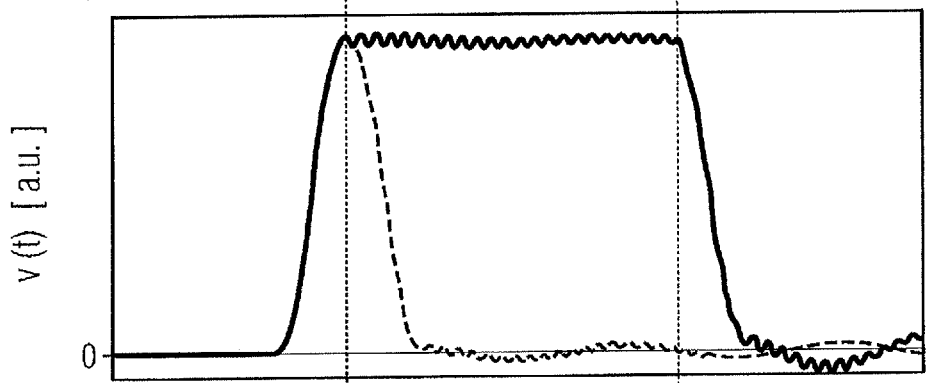
FIG. 4B shows the same speed measurement as a function of time as shown in FIG. 3B according to a first and a second embodiment of the invention.
Figure 4A:
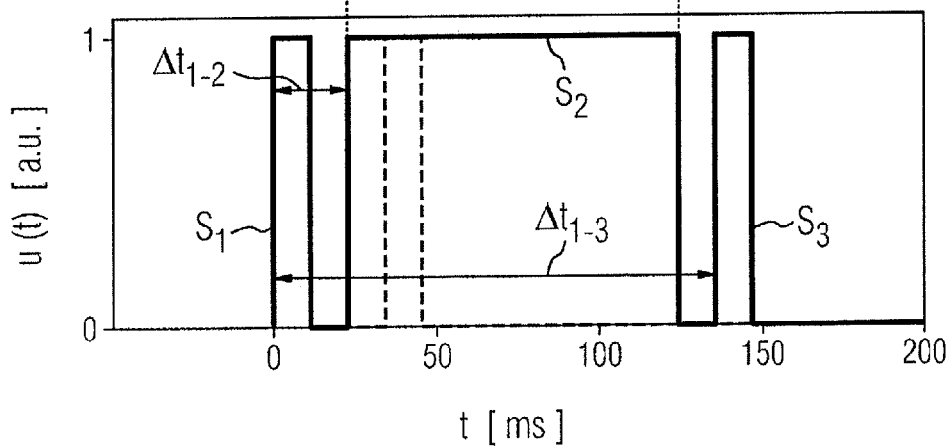
FIG. 4A shows the same quantity measurement as a function of time as shown in FIG. 3A according to a first and a second embodiment of the invention.

The diagram of FIG. 4A shows in the form of a continuous line the control signal u(t) for the first control valve 20 as a function of the time t, wherein the control signal u(t) is shown here for the case that the desired travel $\Delta x$ is greater than $\Delta x_{min}$.

In the present case, i.e. with $\Delta x > \Delta x_{min}$, the control signal u(t) has the first switching pulse $S_1$ and the further switching pulse $S_3$, the pulse duration $\tau_1$ of each of the two is equal to a sixth of the intrinsic period duration $T_1$.

In addition, the control signal u(t) between the first and the further switching pulse $S_1$, $S_3$ has the previously mentioned additional switching pulse $S_2$. The pulse duration of the additional switching pulse $S_2$ (i.e. of the middle switching pulse) is equal to the quotient $(\Delta x - \Delta x_{min})/\bar{v}$.

Between the first and the additional switching pulse $S_1$ and $S_2$, the control signal u(t) has a first pause and between the additional and the further switching pulse $S_2$ and $S_3$ the control signal u(t) has a second pause, wherein the respective pause duration is equal to the pulse duration $\tau_1$ of the first and of the further switching pulses $S_1$ and $S_3$. In the present case, the time interval $\Delta t_{1-3}$ between the start of the first switching pulse $S_1$ and the start of the further switching pulse $S_3$ consequently corresponds to $3\tau_1+(\Delta x-\Delta x_{min})/\bar{v}$. The time interval $\Delta t_{1-2}$ between the start of the first switching pulse $S_1$ and the beginning of the additional switching pulse $S_2$ amounts to $2\tau_1$.

In the upper diagram of FIG. 4C, the position x(t) of the drive piston 8 as a function of the time t is shown in the form of a continuous line. As is evident from this diagram, upon an activation of the first control valve 20 with the control signal u(t) shown in FIG. 4 (see continuous line in the lower diagram of FIG. 4), the drive piston 8 moves by the distance $\Delta x$ without oscillating significantly in the process. Accordingly, the movably mounted body 14 attached to the drive piston 8 also moves by the distance $\Delta x$ without oscillating significantly.

The first and the further switching pulse $S_1$ and $S_3$ jointly cause the drive piston 8, and thereby also the movably mounted body 14 of the mechanical system 2 attached to the drive piston 8, to move by the distance $\Delta x_{min}$. The additional switching pulse $S_2$ causes the drive piston 8, and thus also the movably mounted body 14 attached to the drive piston 8, to (additionally) move by the difference ($\Delta x-\Delta x_{min}$). Together, the three switching pulses $S_1$, $S_2$, $S_3$ thus cause the drive piston 8, and thus also the movably mounted body 14 attached to the drive piston 8, to move by the distance $\Delta x$.

From the middle diagram of FIG. 4B, in which the speed v(t) of the drive piston 8 is shown in the form of a continuous line, during the additional switching pulse $S_2$ it is evident that the drive piston 8 moves with an approximately stationary speed. (Minor high-frequency vibrations of the speed v(t) can be attributed to high-frequency eigenfrequencies of the mechanical system 2.) The speed of the drive piston 8 simultaneously corresponds to that of the movably mounted body 14 of the mechanical system 2 attached to the drive piston 8.

For comparison, the control signal u(t) from FIG. 3C and the associated position x(t) of the drive piston 8 and the associated speed v(t) of the drive piston as a function of the time t are each shown in the form of a dashed line in the diagrams of FIG. 4.

Figure 5C:
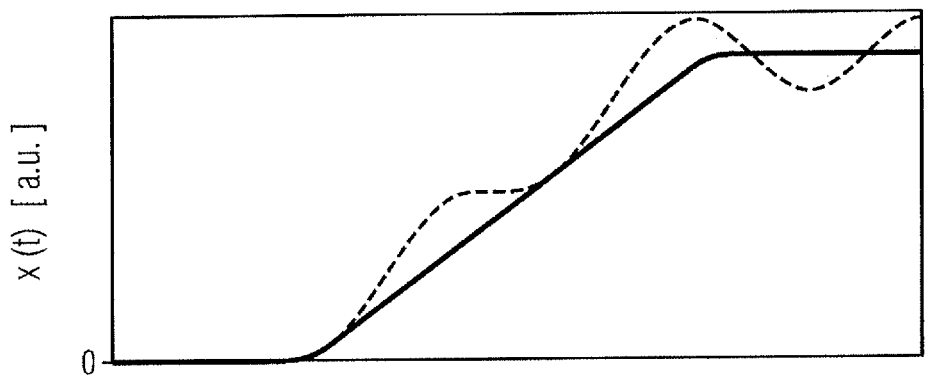
FIG. 5C shows the same position of measurement of the entire piston as a function of time as in FIG. 3C according to a second embodiment of the invention.
Figure 5B:
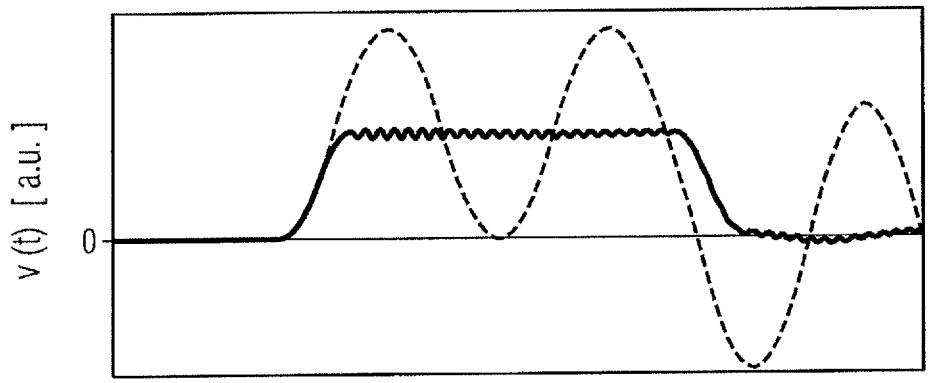
FIG. 5B shows the same speed measurement as a function of time as shown in FIG. 3B according to a second embodiment of the invention.
Figure 5A:
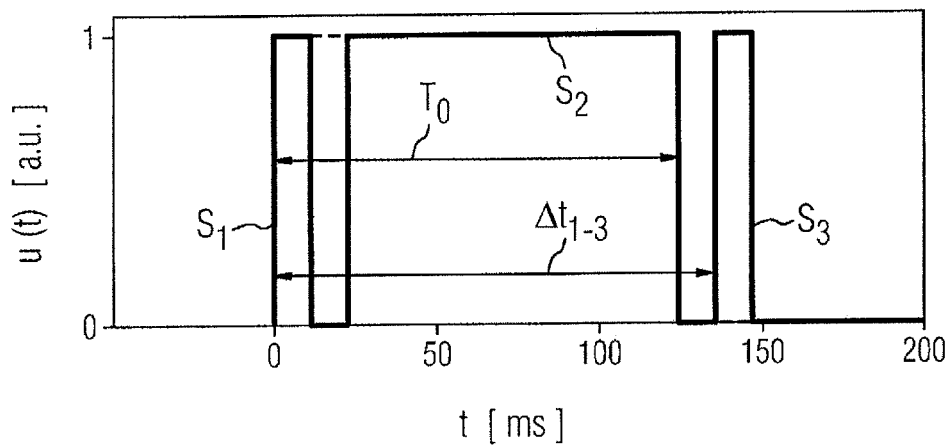
FIG. 5A shows the same quantity measurement as a function of time as shown in FIG. 3A according to the second embodiment of the invention.

Three diagrams are also shown in FIGS. 5A, 5B and 5C. These three diagrams show the same three quantities as a function of the time t, as are also shown in FIGS. 3A, 3B and 3C and FIGS. 4A, 4B and 4C as a function of the time t, namely the control signal u(t), the position x(t) of the drive piston and the speed v(t) of the drive piston 8.

The time profiles of the control signal u(t), the position x(t) of the drive piston 8 and the speed v(t) of the drive piston 8 each shown in FIGS. 5A, 5B and 5C in the form of a continuous line are identical to the time profiles of these quantities each shown in FIGS. 4A, 4B and 4C in the form of a continuous line.

For comparison, another control signal (not according to the invention) for the first control valve 20 is shown in the form of a dashed line in the lower diagram of FIG. 5A, which control signal only has a single switching pulse which begins at t=0 and the pulse duration $T_0$ of which corresponds to the sum of the three previously mentioned switching pulses $S_1$, $S_2$, $S_3$. When the first control valve 20 is activated with this other control signal, the drive piston 8 likewise moves by the distance $\Delta x$, however the drive piston 8 in this case oscillates around the position $\Delta x=\Delta x$ or on its way there (see dashed lines in the diagrams of FIGS. 5B and 5C). Accordingly, the movably mounted body 14 of the mechanical system 2 attached to the drive piston 8 also oscillates during such activation.

With the time profiles shown in FIG. 3A to FIG. 5C it was presumed that the switching time $t_s$ of the first control valve 20 is shorter than a sixth of the intrinsic period duration $T_1$.

In the case that this presumption is not satisfied, i.e. in the case that the switching time $t_s$ is longer than a sixth of the intrinsic period duration $T_1$, the first control valve 20 is ballistically activated, wherein other pulse durations for the switching pulses are adjusted.

Figure 6C:
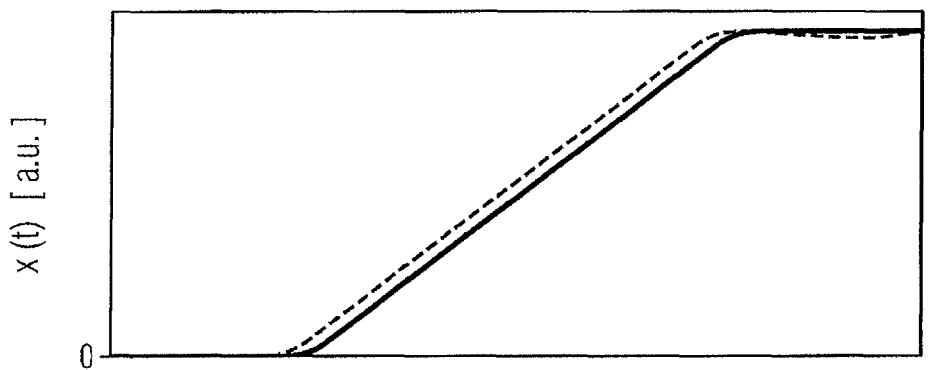
FIG. 6C shows the same position of measurement of the entire piston as a function of time as in FIG. 5C with a ballistic valve actuator.
Figure 6B:
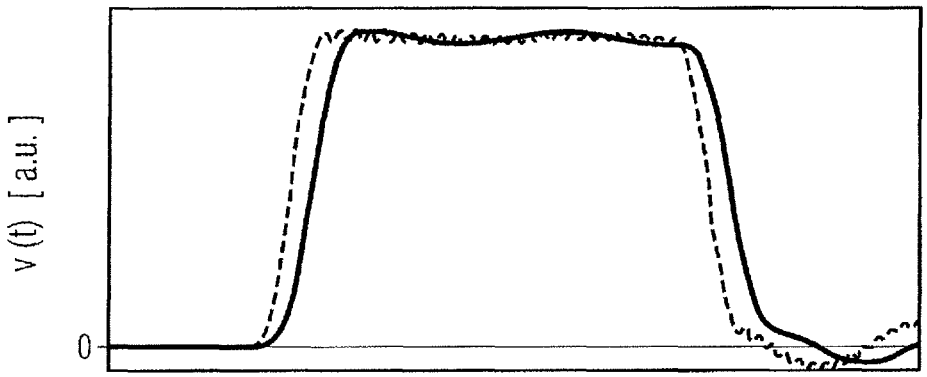
FIG. 6B shows the same speed measurement as a function of time as shown in FIG. 5B with a ballistic valve actuator.
Figure 6A:
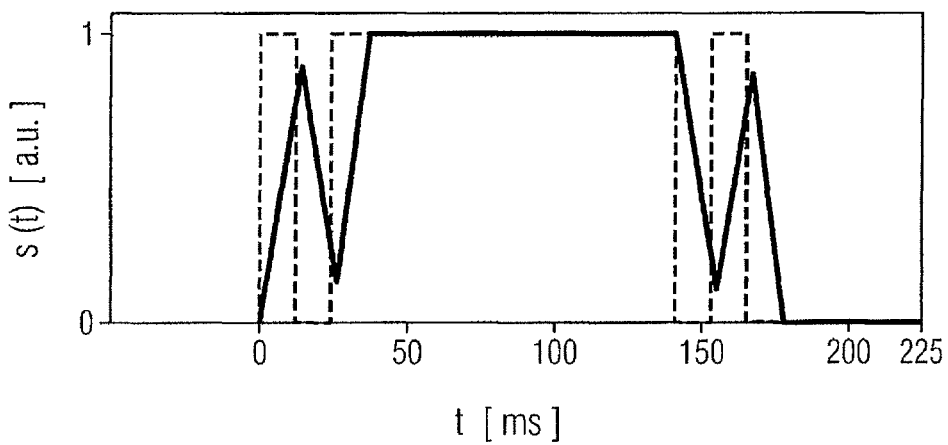
FIG. 6A shows the same quantity measurement as a function of time as shown in FIG. 5A with a ballistic valve actuator.

In FIG. 6, three diagrams FIGS. 6A, 6B and 6C are again shown. The upper and the middle diagram of FIGS. 6B and 6C show, as already in FIG. 3 to FIG. 5, the position x(t) of the drive piston 8 or the speed v(t) of the drive piston 8 as a function of the time t.

In connection with FIGS. 6A, 6B and 6C, it is assumed that the switching time $t_s$ of the first control valve 20 amounts to for example 15 ms, i.e. is longer than a sixth of the intrinsic period duration $T_1$. In this case, the first control valve 20 is ballistically activated.

Other than in FIG. 3A to FIG. 5C, the lower diagram of FIG. 6C shows a position s(t) of the valve piston of the first control valve 20 as a function of the time t. There, the value "1" in this diagram stands for a position of the valve piston in which the first control valve 20 is completely opened, while the value "0" stands for a position of the valve piston in which the first control valve 20 is completely closed. Accordingly, values between 0 and 1 relate to intermediate positions of the valve piston between these two positions.

The time profile of the position s(t) of the valve piston with the ballistic activation of the first control valve 20 is shown in the diagram of FIG. 6A in the form of a continuous line.

The control signal ũ(t), with which the first control valve 20 is activated upon the ballistic activation, can be mathematically expressed by the following formula (control signal ũ(t) in arbitrary units):

$$\tilde{u}(t) = \begin{cases} 1 & \text{for } 0 \le t \le \tilde{\tau}_1 = \frac{1}{2}\left(\frac{T_1}{6}+t_S\right) \\ 0 & \text{for } \tilde{\tau}_1 < t < \tilde{\tau}_2 = 2\tilde{\tau}_1 \\ p' & \text{for } \tilde{\tau}_2 \le t \le \tilde{\tau}_3 = \tilde{\tau}_2 + \frac{\Delta x - \Delta x'_{min}}{\bar{v}} \forall \Delta x \ge \Delta x'_{min} \\ 0 & \text{for } \tilde{\tau}_3 < t < \tilde{\tau}_4 = \tilde{\tau}_3 + \tilde{\tau}_1 \\ 1 & \text{for } \tilde{\tau}_4 \le t \le \tilde{\tau}_5 = \tilde{\tau}_4 + \tilde{\tau}_1 \\ 0 & \text{for } t > \tilde{\tau}_5 \end{cases}$$

With the following definition:

$$p' = \begin{cases} 1 & \text{for } \Delta x > \Delta x'_{min} \\ 0 & \text{for } \Delta x = \Delta x'_{min} \end{cases}$$

From the formula for ũ(t), it follows that the control signal ũ(t) in the time interval $0 \le t \le \tilde{\tau}_1$ has a first switching pulse and in the time interval $\tilde{\tau}_4 \le t \le \tilde{\tau}_5$ has a further switching pulse.

From the definition of the parameter p' it follows that the control signal ũ(t) between the first and the further switching pulses in the time interval $\tilde{\tau}_2 \le t \le \tilde{\tau}_3$ has an additional switching pulse if $\Delta x$ is greater than $\Delta x_{min}'$. When, by contrast $\Delta x$ is equal to $\Delta x_{min}'$, the control signal $\tilde{u}(t)$ does not have any such additional switching pulse between the first and the further switching pulses.

In the present case, the first and the further switching pulses have a different pulse duration $\tilde{t}_1^*$ than upon an activation according to FIG. 3 or FIG. 4. For the pulse duration $\tilde{t}_1^*$ of the first and further switching pulse the following applies in the present case:

$$\tilde{t}_1^* = \frac{1}{2}(\tau_1 + t_S) = \frac{1}{2}\left(\frac{T_1}{6} + t_S\right)$$

The pulse duration $\tilde{t}_1^*$ of the first and further switching pulses thus corresponds to the arithmetic mean value from the switching time $t_s$ of the first control valve 20 and a sixth of the intrinsic period duration $T_1$.

Accordingly, the following applies to the smallest possible step width $\Delta x_{min}'$ of the drive unit 4, by which the movable drive element of the drive unit 4 moves when the control signal $\tilde{u}(t)$ only has the first and the further switching pulses and not the additional switching pulse:

$$\Delta x_{min}' = 2\bar{v}\tilde{t}_1^* = \frac{2Q\tilde{t}_1^*}{A_K}$$

In the case shown in FIG. 6, it is presumed that the set point value of the travel of the drive piston 8 should have the same amount $\Delta x$ as with the valve activation according to FIG. 4 and FIG. 5. In the present case, the control signal $\tilde{u}(t)$ between its first and its further switching pulses additionally has the additional switching pulse.

From the lower diagram of FIG. 6C, it is evident that the first and the further switching pulse of the control signal $\tilde{u}(t)$ have such a short pulse duration $\tilde{t}_1^*$ that, by way of the pulse-like actuation of the first control valve 20 through the first or further switching pulse, the valve piston is thrust in the opening direction without the valve piston reaching its end position with full opening of the control valve 20. Then the valve piston subsequently falls back again in the direction of its closed end position under the effect of the valve spring of the first control valve 20 and/or under the effect of flow forces. The pulse duration of the additional switching pulse of the control signal $\tilde{u}(t)$ by contrast is long enough for the valve piston to reach its end position with full opening of the control valve 20.

For comparison, the position of the valve piston as a function of the time t upon the activation according to FIG. 4C and FIG. 5C is shown in the lower diagram of FIG. 6C, in which it is presumed that $t_s \le T_1/6$ applies, in the form of a dashed line. In addition, the time profile of the position x(t) of the drive piston 8 or the time profile of the speed v(t) of the drive piston 8 from FIGS. 4A and 4B and FIGS. 5A and 5B are shown in the upper and middle diagram of FIGS. 6A and 6B in the form of a dashed line.

From the diagrams of FIGS. 6A, 6B and 6C it is evident that in the case of the ballistic activation of the first control valve 20 with the adapted pulse duration $\tilde{t}_1^*$ the drive piston 8 covers the same distance $\Delta x$ as in the case of the activation described in connection with FIGS. 4A, 4B and 4C and FIGS. 5A, 5B and 5C (with which however $t_s \le T_1/6$ was presumed).

With the ballistic activation of the first control valve 20, the drive piston 8, and thus also the movably mounted body 14 attached to the drive piston 8, also moves without vibrating significantly. However, in the case of the ballistic activation with the adapted pulse duration $\tilde{t}_1^*$ because of the longer switching time $t_s$) the movement of the drive piston 8 takes place with a short time delay relative to the movement of the drive piston 8 shown in FIG. 4C and FIG. 5C.

When the case that the set point value of the travel $\Delta x$ of the drive piston 8 is to be equal to $\Delta x_{min}'$, the additional switching pulse in the control signal $\tilde{u}(t)$ is missing.

To realize a drive movement of the drive unit 4 with the aid of the second control valve 22, with which an excitation of undesirable vibrations of the mechanical system 2 is largely avoided, the second control valve 22 can be activated by the control unit 42 analogously to the manner described in connection with FIG. 3 to FIG. 6. In other words, the above explanations concerning the activation of the first control valve 20 analogously apply to the second control valve 22.

The descriptions of the following exemplary embodiments are each primarily limited to the differences from the preceding exemplary embodiment, to which reference is made regarding constant features and functions For serving the purpose, elements which are substantially the same or correspond to one another are marked with the same reference signs and features which are not mentioned and are taken over in the following exemplary embodiments without being described again.

Figure 7:
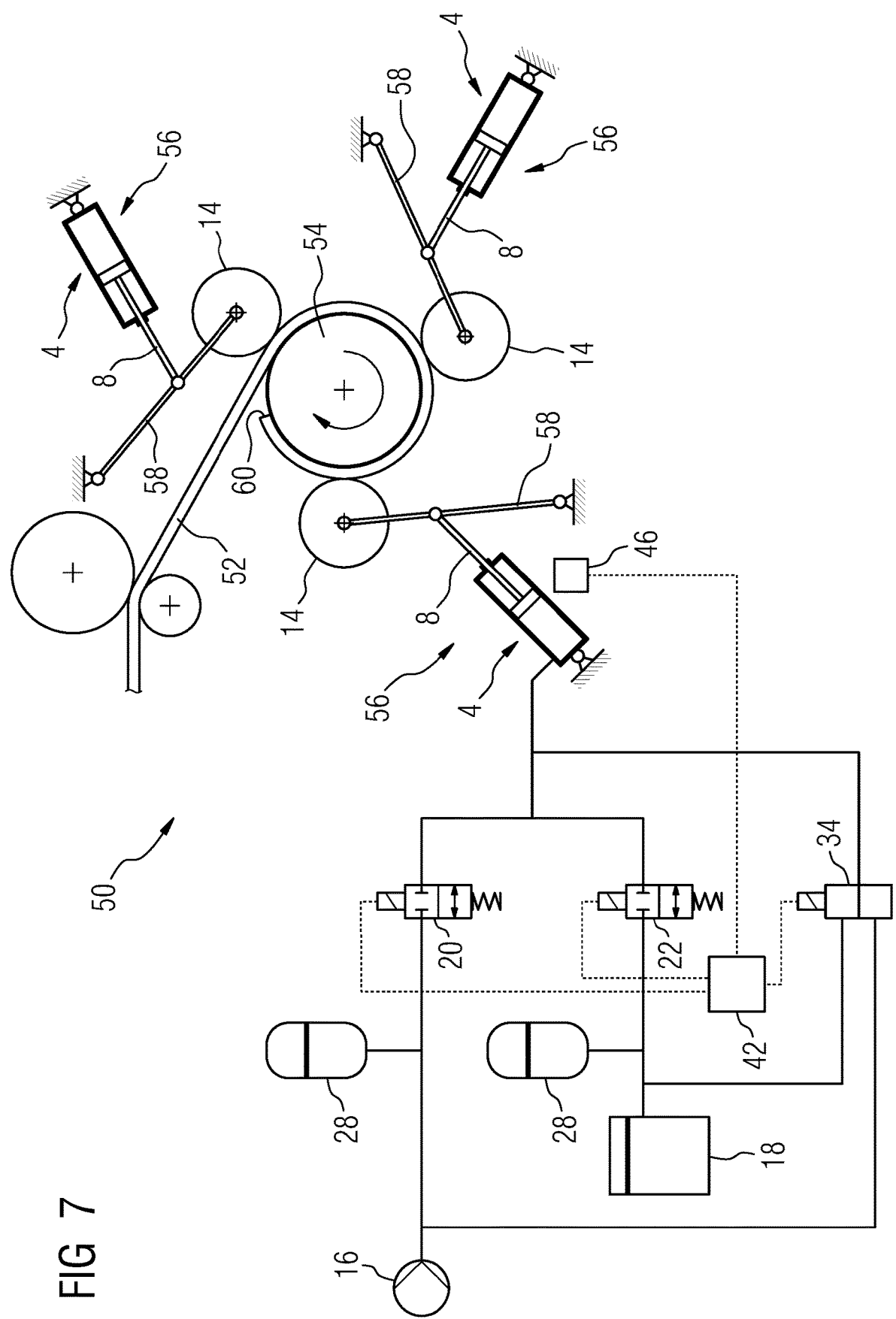
FIG. 7 shows a coiler for winding up a metal strip comprising three mechanical systems each with a pressure roller and a hydraulic cylinder.

FIG. 7 shows a schematic representation of a coiler 50 for winding up a metal strip 52 into a coil.

The coiler 50 comprises among other things a rotatably mounted coiler drum 54. Furthermore, the coiler 50 in the present exemplary embodiment comprises three mechanical systems 56 of identical design.

Each of these three mechanical systems 56 comprises a drive unit 4 that is operable with a medium, which drive unit 4 is a hydraulic cylinder and comprises a moveable drive piston 8 as its drive element. In addition, each of the three mechanical systems 56 comprises a movably mounted body 14 which is driven with the aid of the drive unit 4, and a pivotable pivot arm unit 58 attached to a foundation, which is connected to the drive piston 8 of the drive unit 4 and forms a vibratory part of the mechanical system 56.

In this present exemplary embodiment, the movably mounted body 14 of the respective mechanical system is a pressure roller for pressing the metal strip 52 on the drum against the coiler drum 54 or against the already wound-up part of the metal strip 52, wherein the pressure roller is rotatably mounted on the pivot arm unit 58 of the respective mechanical system 56. Otherwise, the respective mechanical system 56 of the coiler 50 is configured like the mechanical system 2 in FIG. 1. This means, in particular, that each of the three mechanical systems 56 comprises a first control valve 20, a second control valve 22 and a further control valve 34 for controlling a drive movement of the drive unit 4, wherein each of the first and second control valves 20, 22 is a digital valve and the further control valve 34 is a proportional valve.

In FIG. 7, components of only one of the three mechanical systems 56 are shown exemplarily for the control of the drive movement of the drive unit 4. The other two mechanical systems 56 of the coiler 50, include components that are not shown for clarity of FIG. 7.

During a winding-up operation of the metal strip 52 during which the metal strip 52 is wound onto the rotating coiler drum 54, the pressure roller of each of the three mechanical systems 56 of the coiler 50 is pressed against the metal strip 52 with the aid of the drive unit 4 of the respective mechanical system 56.

For as long as fewer than n windings of the metal strip 52 have been wound onto the coiler drum 54 during the winding-up operation of the metal strip 52, there is an instant for each of the mechanical systems 56 at which the strip beginning 60 of the metal strip 52 lying on the coiler drum 54 is situated between the rotary axis of the coiler drum 54 and the rotary axis of the pressure roller of the respective mechanical system 56. The pressure roller is lifted off the metal strip 52 at a predefined period of time before the instant and after a predefined period of time the pressure roller is again set onto the metal strip 52. This avoids the inner n windings of the metal strip 52 being pressed against the strip beginning 60, wherein n is a natural number. Typically, n is 3, 4 or 5.

The lifting-off and setting-down of the respective pressure roller is controlled with the aid of the first and second control valves 20, 22 of the respective mechanical system 56. In order to avoid the respective pressure roller being excited to vibrate during lifting-off and/or setting down the roller, the first and second control valves 20, 22 of the respective mechanical system 56 are activated with one of the previously described control signals u(t), ũ(t), wherein the pulse duration of the first and further switching pulses is adapted to a eigenfrequency or an intrinsic period duration of the respective mechanical system 56.

Simple movements of the respective pressure roller, for example pivoting it in and out, can be controlled for example with the aid of the further control valve 34 of the respective mechanical system 56, particularly by means of a PWM activation of the further control valve 56.

The coiler 50 need not necessarily comprise precisely three mechanical systems 56. The coiler 50 may have a different number of such mechanical systems 56, for example four, which are controlled in the manner described above.

Figure 8:
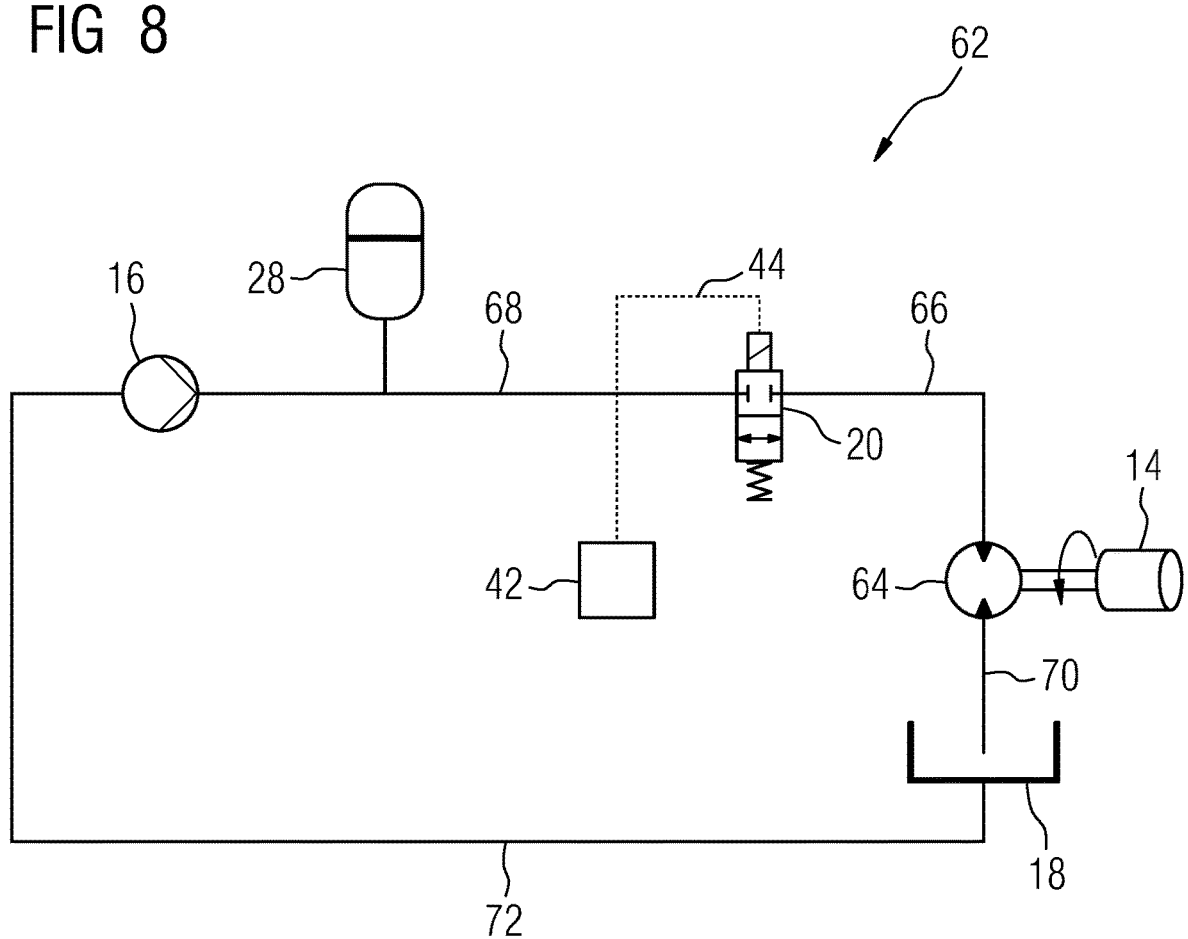
FIG. 8 shows a further mechanical system which comprises a hydraulic motor, a rotatably mounted body, a control valve and a control unit.

FIG. 8 shows a schematic representation of a further mechanical system 62.

This mechanical system 62 likewise comprises a rotary drive unit 64 that is operable with a medium and a movably mounted body 14 which is driven by the drive unit 64. The drive unit 64 compromises a hydraulic motor which comprises a rotor as moveable drive element which is not shown by FIGS. Furthermore, the movably mounted body 14 in this embodiment is rotatably mounted.

The mechanical system 62 comprises a pressure source 16 comprised of a pump and a pressure sink 18 comprised of a tank.

The mechanical system 62 FIG. 8 further comprises a control valve 20 which is a digital valve and is controlled from a control unit 42 of the mechanical system 62, wherein the control valve 20 is connected to the control unit 42 via a signal transmission line 44.

The control valve 20 is connected to the drive unit 64 via a first fluid line 66 of the mechanical system 62. The control valve 20 is connected to the pressure source 16 by a second fluid line 68 of the mechanical system 62, wherein a pressure accumulator 28 partially filled with a gas is connected to the second fluid line 68.

Furthermore, the pressure sink 18 is connected to the drive unit 64 via a third fluid line 70 of the mechanical system 62. A fourth fluid line 72 of the mechanical system 62 connects the pressure sink to the pressure source 16.

When the control valve 20 is opened, the medium provided by the pressure source 16 flows via the control valve 20 to the drive unit 64 and drives its rotor which drives the movably mounted body 14. The medium exiting the drive unit 64 flows to the pressure sink 18 from where the medium is delivered to the control valve 20 from the pressure source 16 formed as a pump.

To realize a drive movement of the drive unit 64 with the aid of the control valve 20, during which excitation of undesirable vibrations of the mechanical system 62 is largely avoided, the control unit 42 activates the control valve 20 with a digital electrical control signal w(t). The time profile of the signal can be mathematically expressed by the following formula (control signal w(t) in arbitrary units):

$$w(t) = \begin{cases} 1 & \text{for } 0 \leq t \leq \kappa_1 \\ 0 & \text{for } \kappa_1 < t < \kappa_2 = 2\kappa_1 \\ p & \text{for } \kappa_2 \leq t \leq \kappa_3 = \kappa_2 + \dfrac{\Delta\varphi - \Delta\varphi_{min}}{\overline{\omega}} \forall \Delta\varphi \geq \Delta\varphi_{min} \\ 0 & \text{for } \kappa_3 < t < \kappa_4 = \kappa_3 + \kappa_1 \\ 1 & \text{for } \kappa_4 \leq t \leq \kappa_5 = \kappa_4 + \kappa_1 \\ 0 & \text{for } t > \kappa_5 \end{cases}$$

With the following definition:

$$p = \begin{cases} 1 & \text{for } \Delta\varphi > \Delta\varphi_{min} \\ 0 & \text{for } \Delta\varphi = \Delta\varphi_{min} \end{cases}$$

From the formula for w(t), it follows that the control signal w(t) in the time interval $0 \leq t \leq K_1$ has a first switching pulse with the pulse duration $K_1$ and in the time interval $K_4 \leq t \leq K_5$ has a further switching pulse with the same pulse duration $K_1$.

The pulse duration $K_1$ of the first and second switching pulses is equal to a sixth of the dominant intrinsic period duration of the mechanical system 62 when the switching time $t_s$ of the control valve 20 is maximally as long as a sixth of the dominant intrinsic period duration. By contrast, when the switching time $t_s$ of the control valve 20 is longer than a sixth of the dominant intrinsic period duration of the mechanical system 62, the pulse duration $K_1$ of the first and second switching pulses is equal to the arithmetic mean from a sixth of the dominant intrinsic period duration of the mechanical system 62 and the switching time $t_s$ of the control valve 20.

From the definition of the parameter P it follows, furthermore, that the control signal w(t) between the first and the further switching pulses in the time $K_2 \leq t \leq K_3$ has an additional switching pulse if $\Delta\varphi$ is greater than $\Delta\varphi_{min}$. By contrast, if $\Delta\varphi$ is equal to $\Delta\varphi_{min}$, the control signal w(t) does not have any such additional switching pulse between the first and the further switching pulses.

The quantity $\Delta\varphi$ stands for the rotation angle to be covered by the movable drive element of the drive unit 64 during its drive movement, i.e. for the set point value of the rotation angle of the rotor. Furthermore, the quantity $\Delta\varphi_{min}$ stands for a predefined (angular) step width by which the rotor rotates when the control signal w(t) only has the first and the further switching pulse and not the additional switching pulse. $\Delta\varphi_{min}$ corresponds to the smallest possible (angular) step width that can be realized with the drive unit 64 when the control valve 20 is activated with the control signal w(t).

Furthermore, $\overline{w}$ stands for the mean angular velocity of the rotor of the drive unit 64 in the opened state of the control valve 20.

Although the invention has been illustrated and described in more detail by the preferred exemplary embodiments, the invention is not restricted by the disclosed examples and other versions can be derived from this without leaving the protected scope of the invention.

LIST OF REFERENCE SIGNS

2 System
4 Drive unit
6 Housing
8 Drive piston
9 Ring side
10 Piston head
11 Piston side
12 Piston rod
14 Body
16 Pressure source
18 Pressure sink
20 Control valve
22 Control valve
24 Fluid line
26 Fluid line
28 Pressure accumulator
30 Fluid line
32 Fluid line
34 Control valve
36 Fluid line
38 Fluid line
40 Fluid line
42 Control unit
44 Signal transmission line
46 Position sensor
48 Signal transmission line
50 Coiler
52 Metal strip
54 Coiler drum
56 System
58 Pivot arm unit
60 Strip beginning
62 System
64 Drive unit
66 Fluid line
68 Fluid line
70 Fluid line
72 Fluid line
$S_1$ Switching pulse
$S_2$ Switching pulse
$S_3$ Switching pulse

The invention claimed is:

1. A method for controlling a movement of a movably mounted body of a mechanical system, wherein the mechanical system comprises a drive unit which is configured to be operated by a medium, and a control valve;
the method comprising:
driving the movably mounted body by the drive unit, controlling a drive movement of the drive unit using the control valve;
actuating the control valve by a control signal u(t) which comprises a first switching pulse and a further switching pulse ($S_1$, $S_3$), with each pulse having a predefined pulse duration, the pulse duration of the first switching pulse ($S_1$) being equal to the pulse duration of the further switching pulse ($S_3$); and
a time interval ($\Delta t_{1-3}$) between the start of the first switching pulse ($S_1$) and the start of the further switching pulse ($S_3$), the time interval being adapted to an intrinsic period duration of the mechanical system.

2. A method according to claim 1, wherein the time interval ($\Delta t_{1-3}$) between the start of the first switching pulse ($S_1$) and the start of the further switching pulse ($S_3$) is a linear function of the intrinsic period duration.

3. A method according to claim 2, wherein the time interval ($\Delta t_{1-3}$) between the start of the first switching pulse ($S_1$) and the start of the further switching pulse ($S_3$) is at least half of the intrinsic period duration.

4. A method according to claim 1, further comprising if the control valve has a switching time which is longer than a sixth of the intrinsic period duration, the time interval ($\Delta t_{1-3}$) between the start of the first switching pulse ($S_1$) and the start of the further switching pulse ($S_3$) is a function of the switching time.

5. A method according to claim 1, further comprising the pulse duration of the first switching pulse ($S_1$) and the pulse duration of the further switching pulse ($S_3$) are each a linear function of the intrinsic period duration.

6. A method according to claim 1, further comprising if the control valve has a switching time which is longer than a sixth of the intrinsic period duration, the pulse duration of the first switching pulse ($S_1$) and the pulse duration of the further switching pulse ($S_3$) are each a linear function of the switching time.

7. A method according to claim 1, further comprising the control signal u(t) has an additional switching pulse ($S_2$) with a predefined pulse duration between the first and the further switching pulses ($S_1$, $S_3$).

8. A method according to claim 7, further comprising a time interval ($\Delta t_{1-2}$) between the start of the first switching pulse ($S_1$) and the start of the additional switching pulse ($S_2$) is a linear function of the intrinsic period duration.

9. A method according to claim 7, further comprising
separating the first switching pulse and the additional switching ($S_1$, $S_2$) pulses from one another by a first pause with a predefined pause duration, and the additional switching pulse and the further switching pulse ($S_2$, $S_3$) are separated from one another by a second pause with a second predefined pause duration, the pause duration of the first pause and the pause duration of the second pause each being a linear function of the intrinsic period duration.

10. A method according to claim 9, wherein the pause duration of the first pause is equal to the pause duration of the second pause.

11. A method according to claim 1, wherein the medium for operating the drive unit is a liquid.

12. A method according to claim 1, wherein the control valve is a digital valve.

13. A method according to claim 1, further comprising the movably mounted body is a pressure roller of a coiler, and the drive unit is a hydraulic cylinder.

14. A method according to claim 13, further comprising:
during a winding operation of a metal strip for winding the metal strip onto a coiler drum, pressing the pressure roller against the metal strip then on the coiler with the aid of the drive unit;
moving the pressure roller by the drive movement of the drive unit, during at least one phase of the winding operation for spacing the pressure roller apart from the metal strip when a strip beginning of the metal strip lies on the coiler drum to run through between the pressure roller and the coiler drum.

15. A mechanical system comprising:
a movably mounted body, a drive unit which can be operated by a medium, which drive unit is for driving the movably mounted body;
a control valve for controlling a drive movement of the drive unit;
a control unit which is configured to generate a control signal u(t) for actuating the control valve, wherein the control signal u(t) comprises a first switching pulse and a further switching pulse ($S_1$, $S_3$) each having a predefined pulse duration;
the pulse duration of the first switching pulse ($S_1$) is equal to the pulse duration of the further switching pulse ($S_3$);
a time interval ($\Delta t_{1-3}$) between the start of the first switching pulse ($S_1$) and the start of the further switching pulse ($S_3$) and being adapted to an intrinsic period duration of the mechanical system.

16. A method according to claim 1, wherein the medium for operating the drive unit is an oil.

* * * * *